T. B. ALLEN.
ELECTRIC FURNACE.
APPLICATION FILED APR. 24, 1912.
1,054,380.
Patented Feb. 25, 1913.
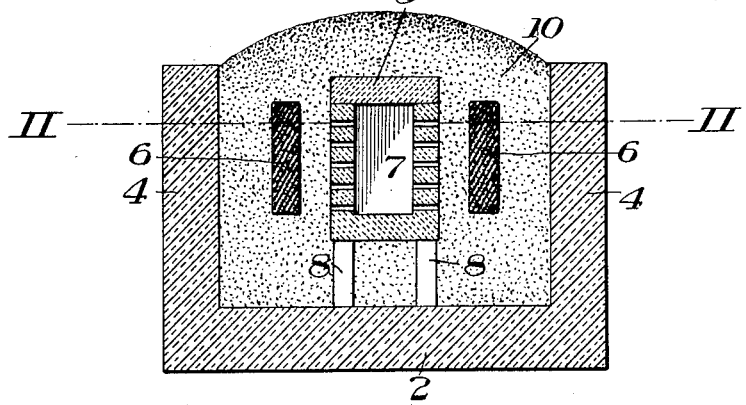
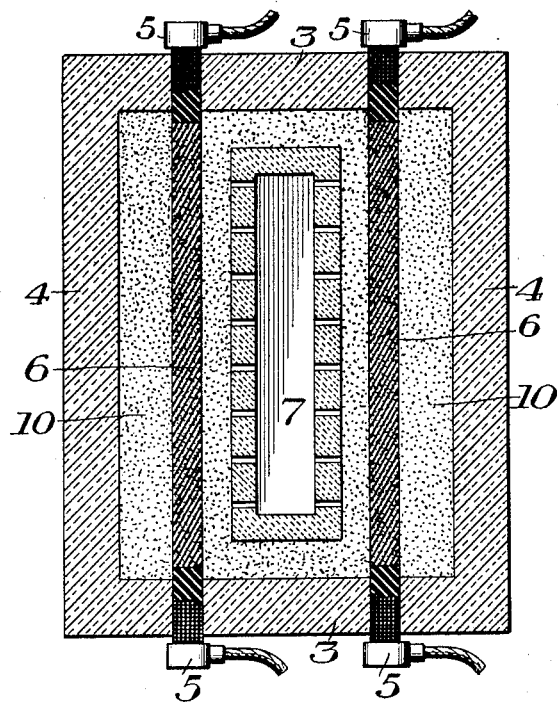
WITNESSES
R A Balderson
INVENTOR
T. B. Allen
by Bakewell Byrnes & Parmelee
his attys

UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ELECTRIC FURNACE.

1,054,380. Specification of Letters Patent. Patented Feb. 25, 1913.

Application filed April 24, 1912. Serial No. 692,825.

*To all whom it may concern:*

Be it known that I, THOMAS B. ALLEN, a resident of Niagara Falls, in the county of Niagara and State of New York, have invented a new and useful Improvement in Electric Furnaces, of which the following is a full, clear, and exact description, reference being had to the accompanying drawings, forming part of this specification, in which—

Figure 1 is a vertical cross section showing one form of furnace embodying my invention; and Fig. 2 is a horizontal section of the same.

My invention relates to electric furnaces of the resistance type, and particularly to the furnace employed for the conversion of shaped articles into silicon carbid, such, for example, as the articles obtained in the process described in United States Letters Patent No. 992,698, granted to Frank J. Tone on May 16, 1911. In such processes, molded articles of silicon carbid and carbon are buried in the mixture of silica and carbon and subjected to a temperature sufficient to form silicon-containing vapors, which penetrate the molded articles and convert them into solid articles of substantially pure silicon carbid. In such processes as heretofore practised, the majority of the energy supplied was consumed in converting the enveloping mixture of silica and carbon into silicon carbid, a relatively small amount of the energy being available for the desired work of silicidizing the articles to be treated. In other words, such furnaces have had a very small capacity in proportion to the power used. Furthermore, uniform radiation from the resistance core into the article being treated was not obtained and the articles were subjected to displacement and other difficulties.

One of the chief uses of the silicidized material or silicon carbid in question is for electrical resistance units. It has many desirable physical qualities for this purpose, such as high specific resistance and high resistance to chemical reagents. On account of its electrical resistance, however, it is not possible to form more than a comparatively short length of resistance; therefore, to consume a sufficient quantity of electrical power to obtain the desired temperature, it is necessary to use the units in multiple. If this is done, it evidently is important that the resistivity of the various units should be practically identical, especially, as the material has a negative temperature coefficient. A further difficulty arises in that the coefficient of resistance varies with the composition of the converted article, that is, with the degree of conversion.

For the above reasons, it is evident that the conditions of conversion should be as absolutely uniform as possible. In the usual furnace heretofore employed, it has been very difficult to obtain this desired result of uniformity. The conversion temperature of amorphous silicon carbid is given in the latest publications as 1520° C. and that of crystalline silicon carbid as 1820° C. and that of the decomposition of crystalline silicon carbid as 2220° C. There is, therefore, a drop of from 500° to 700° C. in the conversion zone of a few inches in thickness, and this makes most difficult the obtaining of a uniform product. It is also of primary importance to have the furnace conditions and methods of heating under absolute control, since varying conditions give widely varying physical properties. Some form of conversion zone which will give better control over the temperature and vapor conditions and method of heating has been necessary, and I have discovered that a much more uniform condition of temperature and a better permeation of the silicon vapors can be obtained in the silicidizing or conversion zones when an inclosed chamber is used, which is practically shut off from the outside atmosphere and communicates only with the atmosphere of the furnace.

In the drawings, 2 represents the base; 3, 3 the head walls, and 4, 4 the side walls of a furnace, these being of suitable refractory material forming a box-like chamber to contain the cores, conversion zones and enveloping mixture.

5 designates the electrode terminals projecting through the head walls and connected to the source of electrical power.

6, 6 are carbon resistance cores, which are preferably of granular carbon, though other resistance material may be employed, and cores of block form or other solid shape may be used. The resistor is so arranged, preferably by elongating it vertically, that it will give the most uniform possible radiation of heat into the walls in the intermediate conversion zone. This conversion chamber, shown at 7, is preferably formed of refractory material, such as bricks or tile of silicon carbid. The walls facing the cores are preferably perforated with holes so that the silicon-containing vapors formed in the surrounding mixture are freely admitted. The chamber is preferably supported by refractory pillars 8, 8, resting on the base of the furnace. The conversion chamber is preferably provided with a movable cover 9, which is removed for charging or discharging the contents of the chamber.

The surrounding mixture, shown at 10, is preferably composed of thirty parts pulverized coke, sixty parts silica sand, and seven parts sawdust, measured by weight. It preferably entirely surrounds the cores and conversion chamber, except that the latter may be supported from the base of the furnace. The proportioning of the cores and the dimensions of the furnace will follow the practice in the well known granular-core silicon-carbid furnace, the principles of which are well known to those skilled in the art.

The furnace is operated in the same manner as a silicon-carbid furnace, and the run is preferably continued until the mixture between the cores and silicidizing zones is converted into silicon carbid. The silicidizing effect may be varied within considerable limits. After the operation has continued a sufficient time to give the desired degree of conversion to the articles which have been placed in the conversion chamber, the furnace is shut down to allow them to cool, the chamber is uncovered, and the articles unloaded.

It is important that the surrounding mixture shown at 10 should be sufficiently porous to permit free circulation of silicon-containing vapors, and in place of using sawdust or similar material for such purpose, it is possible to use the silica and carbon in coarser lumps or a mixture thereof in briquet form. I have also found in certain cases that the addition of silicon carbid to the silica carbon mixture will give improved results. In such cases, this reduces the shrinkage and settlement of the mixture, aids in the conduction of heat from the cores to the silicidizing zones, and has certain other advantages.

The advantages of my invention result from the use of the conversion chamber, which is substantially closed in from the outer atmosphere and is open only to the atmosphere of the furnace. By the use of such furnace, I am enabled to obtain much more uniform results in the converted articles, thus making them of much higher value and widening their range of usefulness.

Many changes may be made in the form and arrangement of the furnace, the character of the charge, cores, conversion chamber, etc., without departing from my invention.

I claim:

1. An electrical silicidizing furnace, containing a silicidizing chamber in communication only with the atmosphere of the furnace and means for obtaining a circulation of silicon-containing vapors in said chamber, and resistors arranged to heat said chamber.

2. An electrical silicidizing furnace, containing a silicidizing chamber in communication only with the atmosphere of the furnace, resistors arranged to heat said chamber, and a porous mixture containing silica and carbon surrounding and separating said chamber and resistors.

3. An electrical silicidizing furnace, having a plurality of resistors, a silicidizing chamber between the resistors and open only to the furnace atmosphere, and a porous mixture containing silicon and carbon surrounding the resistors and the interposed conversion chamber.

4. An electrical silicidizing furnace having a porous charge, resistors embedded in the charge, and a conversion chamber between the resistors arranged to allow vapors to enter its side walls adjacent to the cores.

5. An electrical silicidizing furnace, having a porous charge, a closed conversion chamber open only to the furnace atmosphere, and a resistor embedded in the charge containing silica and carbon and elongated substantially parallel to the conversion chamber.

In testimony whereof, I have hereunto set my hand.

THOS. B. ALLEN.

Witnesses:
MARTIN HAWKE,
F. H. EASLOE.